No. 673,358. Patented Apr. 30, 1901.
J. CALDER.
BINDING MECHANISM AND SHOCKING ATTACHMENT FOR HARVESTER BINDERS.
(Application filed Jan. 17, 1900.)
(No Model.) 3 Sheets—Sheet 1.
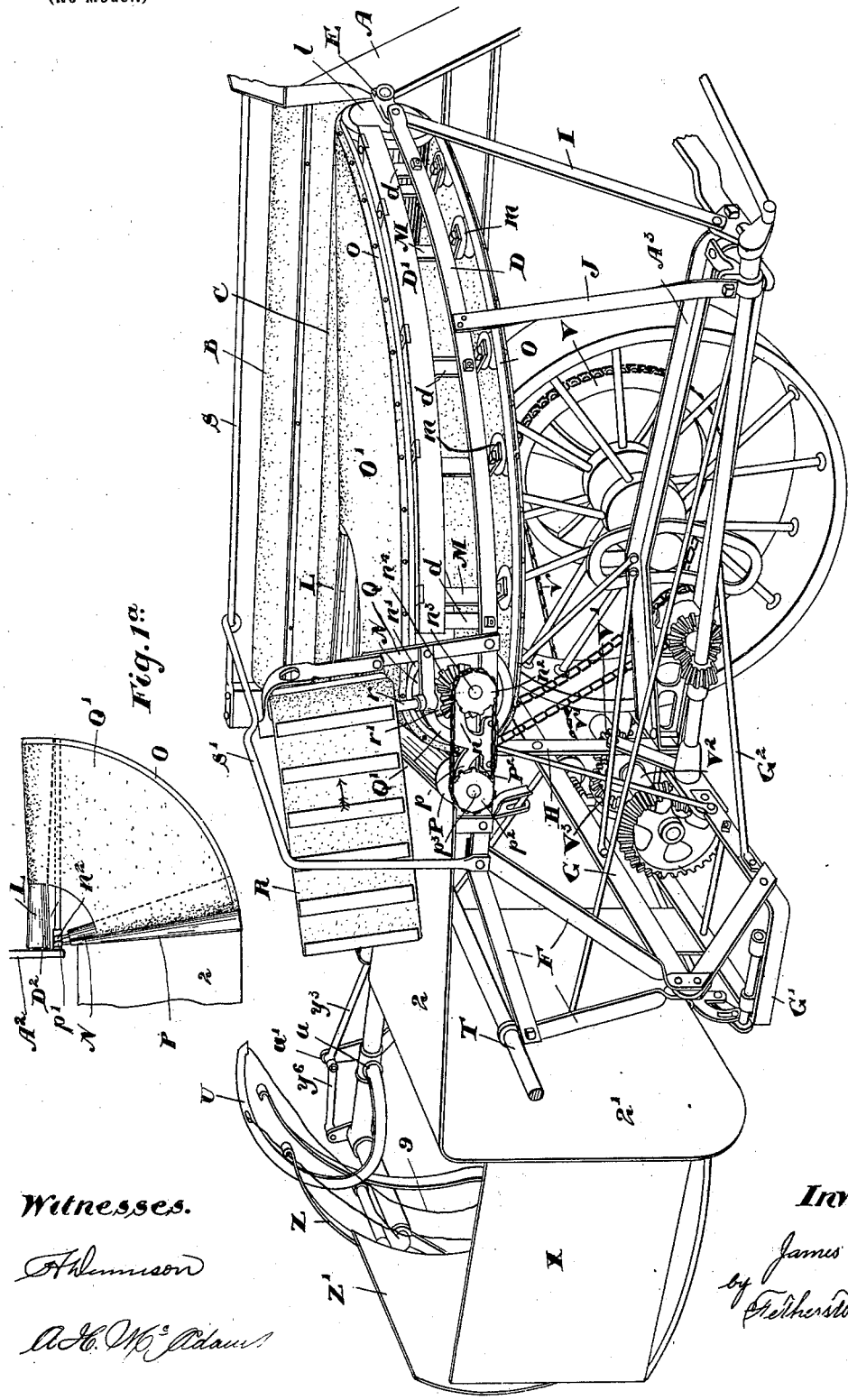
Witnesses. Inventor.
James Calder

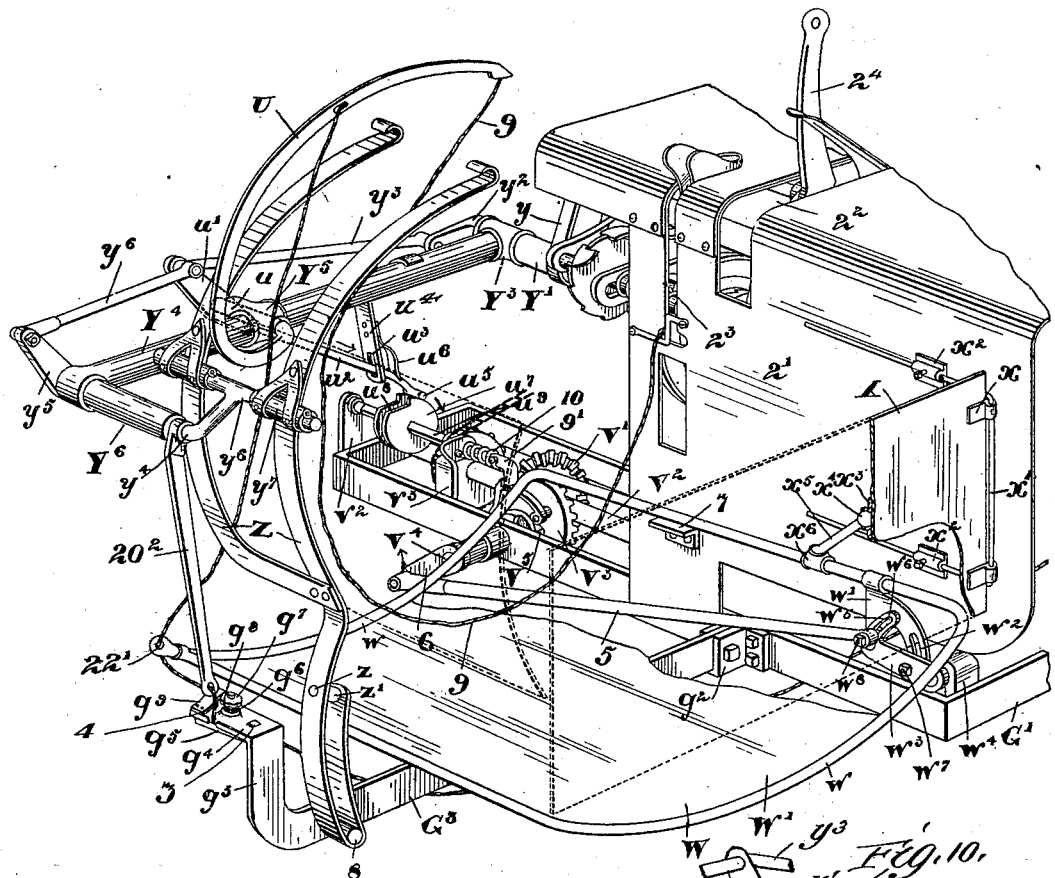

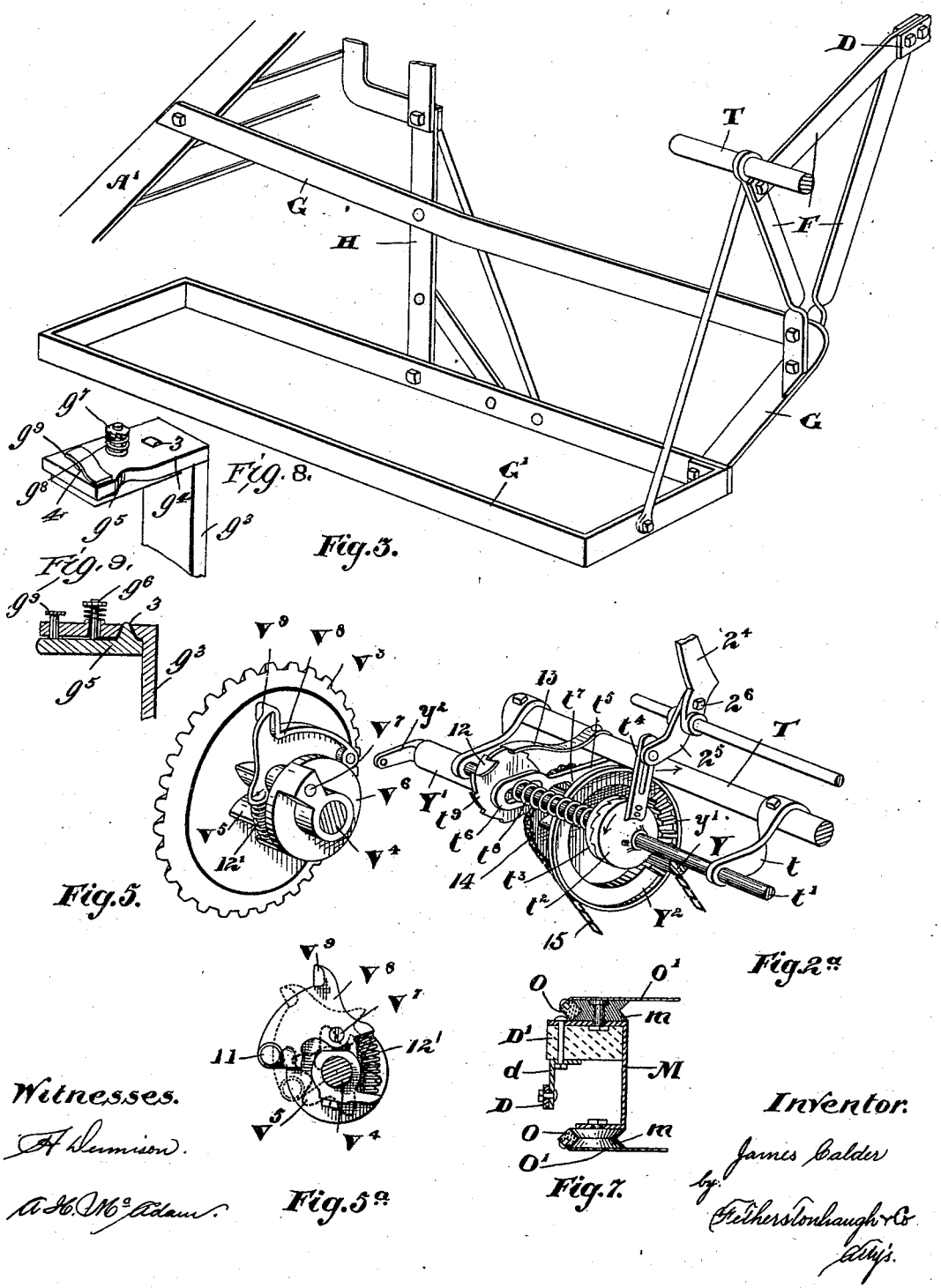

UNITED STATES PATENT OFFICE.

JAMES CALDER, OF HAMILTON, CANADA, ASSIGNOR OF ONE-HALF TO GEORGE SHELDON BINGHAM, OF SAME PLACE.

BINDING MECHANISM AND SHOCKING ATTACHMENT FOR HARVESTER-BINDERS.

SPECIFICATION forming part of Letters Patent No. 673,358, dated April 30, 1901.

Application filed January 17, 1900. Serial No. 1,769. (No model.)

*To all whom it may concern:*

Be it known that I, JAMES CALDER, patternmaker, of the city of Hamilton, in the county of Wentworth, in the Province of Ontario, Canada, (whose post-office address is 39 Park street, Hamilton, Ontario, Canada,) have invented a certain new and useful Improved Binding Mechanism and Shocking Attachment for Harvester-Binders, of which the following is the specification.

My invention relates to an improved binding mechanism and shocking attachment for harvester-binders; and the object of the invention is to devise a simple, efficient, and light attachment readily applicable to an ordinary harvester-binder which will not materially increase the weight of the said binder and will efficiently carry the sheaves into the shocking-receptacle, so that they may be deposited in shocks to the side and rear of the binder; and it consists, essentially, of a suitable frame securely held and braced to the elevator-apron and wheel-frames, the said frame having located at the top a segmental carrying-apron preferably supported on suitable tapered rollers, the said apron leading to the binding-deck, which extends out laterally from the elevating-aprons to the rear of the machine and having located at the rear thereof a shocking-receptacle, into which the sheaves are deposited from the binding-deck and from which they are tilted butt-end downward upon the ground, a suitable knotter mechanism and needle being provided to operate upon the binding-cord to bind the shock and the parts being otherwise constructed and arranged in detail, as hereinafter more particularly explained.

Figure 1 is a perspective side view of a binder, showing my improved binding mechanism and shocking attachment connected to and forming part of the same. Fig. 1ª is a plan view of the apron and rollers acting in conjunction therewith. Fig. 2 is an enlarged perspective detail taken from the rear of the binding-deck and shocking-receptacle as constructed in a binder provided with my improvements. Fig. 2ª is a large perspective detail of the portion of the knotter and trip mechanism acting in conjunction with the needle. Fig. 3 is a skeleton view showing the laterally-extending rear frame by which the binding deck and mechanism and shocking mechanism are supported. Fig. 4 is a detail of the holdfast for the trip-arm, designed to prevent the movement of the binding mechanism during the period that the binding mechanism of the shocker is operating. Fig. 5 is a detail of the trip mechanism for tilting the shocking-receptacle. Fig. 5ª is a view from the opposite side to that shown in Fig. 5 with the gear-wheel removed. Fig. 6 is a detail of the trip of the knotter of the binding mechanism of the shocker. Fig. 7 is a sectional view through the carrying-apron, showing the position of the guiding rollers and belts. Figs. 8 and 9 are detail views of the mechanism for varying the tension. Fig. 10 is a detail view of a portion of the mechanism.

In the drawings like characters of reference indicate corresponding parts in each figure.

Heretofore shocking attachments have been devised as separate machines, which were designed to run alongside of the binder and operate automatically. The defect in this class of machine was not so much in the machine itself as on account of the extra weight it put upon the horses. This form of shocking-machine was also undesirable from the fact that, being supported on separate wheels running alongside of the binder, it would follow the undulations of the ground and not act in unison with the binder, thereby rendering the shocking of the grain very difficult to accomplish. In my invention, however, as distinguished from the aforesaid class of shocking-machines, the whole binding and shocking mechanism is rigidly connected to and supported by the frame of the binder proper, of which it forms a part.

A A' are the side boards of the elevating-apron, and B and C are the lower and upper elevating-aprons, respectively.

D is an arc-shaped bar connected at one end to the casting E at the upper end of the side board A and extending around the side of the machine to a point at right angles to the elevating-aprons, where it is connected to a triangular bracing-frame F, which is secured at the bottom to the laterally-extending frame G. The frame G is secured to the wheel-frame by suitable bolts and to an upright bar H at the rear portion of the wheel-frame. The frame G also extends inwardly to the rear side bar A', the end of the frame being secured by a suitable bolt to this latter side bar.

I is the ordinary brace of the wheel-frame, which is suitably bolted at the bottom thereof to the side frame and at the top to the casting E, and J is a supplemental brace also connected at the bottom to the wheel-frame and at the top bolted to the arc-shaped bar D.

D' is a wooden bar located above the bar D and also arc-shaped in form, the said bar being supported by brackets $d$ upon the bar D or in any other suitable manner.

Instead of using the ordinary-shaped roller L for the horizontal belt I make this roller tapered from the front to the rear for the major portion of its length and provide a grooved pulley $l$ at the front end thereof.

M represents a series of brackets preferably supported upon the arc-shaped bar D' and provided at the top and bottom with guiding-rollers $m$. As shown in the drawings, it will be seen that there are several of these pairs of rollers extending from end to end of the said bar D', the one half of the rollers extending above the bar D' and the other half below the bar D.

N is a tapered roller supported at one end in a suitable bearing $n$, secured to the bar D, and at the opposite end on a bearing $n^2$, secured to the cross-bar $D^2$, which extends from and is supported by the bar D to a suitable bearing in the casing $A^2$, attached to the rear side bar A'. (See Fig. 1ª.) The tapered roller N is provided at the outer end with a pulley $n'$.

The roller L is driven in any suitable manner, the manner of driving being unimportant, as there are several forms of drives adapted by different manufacturers.

O is an endless belt preferably square in cross-section and passing around the pulley $l$ and outside the guiding-rollers $m$ to and around the pulley $n'$ on the end of the tapered roller N. To the guiding-belt is connected the segmental carrying-apron O', which is of the form shown and is caused to move by means of the belt O and the tapered pulleys. I preferably use the belt O, as shown and described, although I may dispense with it.

P is a supplemental roller located in proximity to the tapered roller N and having the spindle thereof supported at the outside in a suitable bearing $p$, secured to the bar D, and at the inside upon a suitable bearing $p'$, secured to the bar $D^2$.

The apron O' serves to carry the grain from the elevating-aprons to the roller P, and the roller P serves to carry the grain from the end of the apron directly onto the binding-deck 2. If this roller were not provided, the grain would have a tendency to choke or become tangled at the point where the roller P is situated.

On the spindle $n^3$ of the roller N, I secure a bevel-wheel $n^4$.

Q is a standard securely bolted at the bottom to the bar D and extending upwardly above the apron O'.

Q' is a brace extending from the standard Q at right angles and being bent at the rear end and connected to the bar D.

R is an ordinary form of butter, which it is not necessary here to describe, as it is commonly understood, but which is provided at the end with the ordinary driving-spindle $r$, journaled at one end in the top of the standard Q and having the lower end extending through the brace and provided with a bevel-pinion $r'$, which meshes with the bevel-pinion $n^4$ on the spindle $n^3$ of the tapered roller N. It will thus be seen that the apron of the butter is given the requisite movement indicated by arrow, so as to carry forward the butts of the grain and keep them even.

The supplemental roller P, hereinbefore described, is driven by the sprocket-chain $P^2$, connecting the sprocket-pinions $p^2$ and $n^2$ on the ends of the spindles $p^3$ and $n^3$ of the rollers P and N, respectively.

S is a rod extending across from standard to standard of the sides of the elevating-apron frame, and S' is a supporting-brace connected to the rod S, extending over the binding-deck and down to the end of the arc-shaped bar D, to which it is securely bolted at one of the apexes of the frame F.

T is the supporting-bar, extending from one of the apexes of the triangular frame F and suitably supported on the frame at the opposite end. This bar supports the ordinary binding deck and mechanism. It will be noticed on reference to Figs. 1 and 2 that the binding-deck 2 has a downwardly-extending portion 2', which is provided with the slots $2^2$ and $2^3$, the slot $2^2$ being made to allow of the working of the ordinary compressor-arm $2^4$ in compressing the sheaf and the slot $2^3$ being utilized for the passing of the point of the needle into proximity with the knotter of the shocking mechanism.

I have not described or shown the ordinary knotter-shaft, needle, and mechanism for tying the sheaf; but it will be understood that such mechanism is situated above the binding-deck 2 and supported on a suitable frame secured to the stay-rod and other portions of the frame G, which is not necessary to describe, as it forms no feature of my invention.

G' is a rectangular frame attached to or forming part of the frame G and extending to the rear of the main driving-wheel. The frame G' is connected by a brace $G^2$ to the main wheel-frame $A^3$.

V is a sprocket-wheel secured to the main driving-wheel axle and connected by the sprocket-chain $v$ to a sprocket-wheel $v'$ on the counter-shaft $V^2$, suitably journaled in bearings in the frame G'.

V' is a bevel gear-wheel secured on the shaft $V^2$ and meshing with the bevel-wheel $V^3$ on the cross-stud shaft $V^4$, suitably journaled in the frame G'.

$G^3$ is a rearwardly-extending bar secured at the forward end by the brackets $g^2$, which are suitably connected to the frame $G'$ by bolts, as indicated. The bar $G^3$ has an upward extension $g^3$ at the rear end, which has a laterally-extending offset $g^4$. Secured underneath the offset $g^4$ by a pin 3 is the plate $g^5$, which is spring-held to the bottom of the offset by the pin $g^6$, connected with the plate and extending up through a hole in the offset $g^4$. The pin is provided with a nut $g^7$ and a spring $g^8$ between the nut and the plate. The normal tendency of the spring pressing upwardly upon the nut is to force the plate $g^5$ up against the underneath portion of the offset.

$g^9$ is a spring-plate secured to the offset $g^4$ and having a depending pin 4, which contacts with the plate $g^5$. The offset $g^4$ and the parts connected therewith are for a purpose which will hereinafter appear.

W is a rectangular frame with arc-shaped ends $w$ and a suitable bottom $W'$, also arc-shaped correspondingly to the ends and designed to form a receptacle to receive the sheaves to form the shock.

$w'$ is a bracket having a tubular portion fitting on the side of the frame W and an arc-shaped depending portion provided with a slot $w^2$.

$w^3$ is a crank journaled in a bracket $w^4$ at the outer corner of the frame $G'$. The crank has an arc-shaped end $w^5$, having the arc-shaped slot $w^6$.

$w^7$ is a bolt which extends through the crank $w^3$ and the slot $w^2$. The bolt $w^7$ may be loosened and adjusted in the slot $w^2$, so as to vary the angle at which the receptacle W is placed.

$w^8$ is a bolt extending through the end of the pitman 5 and the slot $w^6$. The opposite end of the pitman 5 is connected to the crank 6 on the end of the stud-shaft $V^4$. It will be seen that by loosening the bolt $w^8$ it may be adjusted in the arc-shaped slot $w^6$, and thereby the throw or tilt of the receptacle varied as desired. From this throw it will be understood that it is comprehended that the receptacle is really pivoted only at one point, and that on the stud of the crank $w^3$.

It will be noticed that as the pivot-point of the swing of the receptacle is almost directly underneath the discharge end such receptacle when it is being tilted raises the butts of the grain by raising itself at the discharge end as it is being tilted, and thereby serves to prevent the butts being caught by the ground before they reach the substantially vertical position into which they are thrown. The front side bar of the receptacle $W'$ is partially supported when in its lowered position by the bracket 7, secured to the depending portion $2'$ of the binder-deck. It will of course be understood that the crank 6 derives a rotary motion from the bevel gear-wheel $V^3$ in the manner which will hereinafter appear, and such rotary motion serves to tilt the receptacle and discharge the shock and return the receptacle to the horizontal position again.

At the discharge end of the receptacle I preferably provide a gate X, which is provided with hinges $x$, by which it is swung upon the staple-shaped rod $x'$, which is adjustably supported in the brackets $x^2 x^2$. The gate has a socket $x^3$ secured at the inner side thereof, into which fits the ball $x^4$ of the bar $x^5$. The lower end of the bar $x^5$ fits into a socket $x^6$, attached to the side of the receptacle. It will therefore be understood that when the receptacle is being tilted the movement of the receptacle will be communicated to the gate X, and consequently such gate will be swung back on its hinge and permit of the passage of the shock to the ground. When the receptacle is restored to its normal position, the gate necessarily returns to its normal position and is held firmly in place.

As before described, the gate is hinged on the adjustable rod $x'$, and consequently the gate may be adjusted to the varying lengths of the grain by moving the rod $x'$ longitudinally in the bearing-brackets $x^2$. It will of course be understood that the sleeve having socket $x^6$ thereon is moved longitudinally as rod $x'$ is shifted, so that the parts will maintain the same relative positions in all adjustments of said rod.

Y is the knotter-shaft for the shock-binding mechanism, which extends through the tube $Y'$, supported by suitable bars $y$, (one only of which is shown,) connected to the frame of the machine underneath the binding-deck.

$Y^2$ is the knotter-wheel, secured on the shaft Y and provided with the usual segmental gear $y'$, which operates the bill-hook and knotting mechanism which is designed to be used in connection with the needle U, but which it is not necessary here to describe, as any suitable form of knotting mechanism may be employed.

$Y^3$ is a tubular T-joint connected to the tube $Y'$, and $Y^4$ is a tube or pipe extending laterally at right angles to the tube $Y'$ from the T-joint $Y^3$.

$Y^5$ is a tubular bracket into which the tube $Y^4$ extends and through which extends the journal-spindle $u$ of the needle U, which, it will be observed, is very short and contracted in form.

$y^2$ is a crank secured on the end of the knotter-shaft Y and connnected by a rod $y^3$ to the arm $u'$ on the journal-pin $u$ of the needle U.

$Y^6$ is a right-angular tubular extension to the tube $Y^4$, through which extends the crank-spindle $y^4$. At the outer end of the crank-spindle $y^4$ is secured an arm $y^5$, which is connected by the rod $y^6$ to the arm $u'$.

It will be noticed that the crank-shaft $y^4$ is provided with a T-shaped end $y^6$ on the end of the crank, and such end $y^6$ extends into the bearings $y^7$ of the forked curved double compressor-arm Z. The compressor-arm is provided with a curved plate Z', secured to one member of the fork and extending toward the discharge end of the receptacle. The lower end of the double compressor-arm is formed by the extension of one of the members of the fork and is of a curved form, as shown, and bent back upon itself, so as to form a confining-loop, the end of the bend being secured in position by the bolt $z$ and separating-sleeve $z'$. The upward movement of the double compressor-arm is limited by the pin 8, extending outwardly from the brace $G^3$. It will be noticed that I do not form any side to my receptacle. The compressor-arm, however, serves, when operated as hereinafter described, to compress the sheaves of the shock, so as to make them as compact as possible preparatory to their being bound by the cord 9, which passes from the needle, which, it will be observed, is situated so as to work freely between the two members of the forked compressor-arm.

The arm $u'$ is a double arm and has connected to the lower end the rod $u^2$, which extends through a slot $u^3$ in the bracket $u^4$, secured to the tube $Y^4$. The rod $u^2$ has a T-shaped end $u^5$, which is held down by a spring $u^6$ against the periphery of the wheel $u^7$, provided with a segmental notch $u^8$. The wheel is secured on the spindle $u^9$, which is journaled in the bearing-brackets $v^2$ and $v^3$. The spindle $u^9$ has a bent outer end 9' and a spiral spring 10 encircling it and fastened at one end to the bracket and at the other to the rod and designed to exert a turning movement to the rod, so as to always keep the bent outer end 9' turned down, for a purpose which will hereinafter appear. The bevel gear-wheel $V^3$ has located to one side of it and secured to it the toothed wheel $V^5$. Adjacent to the toothed wheel $V^5$ is located the collar $V^6$. The bevel-wheel $V^3$ is loose on the stud-shaft $V^4$, but the collar $V^6$ is secured on the same. Pivoted on the pin $V^7$, extending inwardly from the collar, is the trip $V^8$, which is provided with a contacting projection $V^9$ and a roller 11, which is designed to be brought into contact with the toothed wheel $V^5$ (see full lines in Fig. 5 and dotted lines in Fig. 5$^a$) by the spiral spring 12' when the trip is released from the end of the rod $u^9$. By so releasing the trip the toothed wheel is connected to the shaft $V^4$ through the medium of the collar $V^6$, and thereby the requisite rotary movement is given to the crank 6, so as to tilt the receptacle W to discharge the shock. It is necessary that this should be done at a certain interval, and that interval is when the needle U has finished its work and knot has been tied by the knotter and the cord severed—in other words, at the period when the needle has nearly receded back into the position shown in the drawings. As the needle U passes forward into proximity with the knotter it necessarily brings the T-shaped end of the rod $u^2$ into engagement with the segmental notch in the wheel $u^7$. Upon the needle receding back toward the position shown in the drawings the rod necessarily is thrown in the direction indicated by arrow, thereby pushing around the wheel $u^7$ and releasing the bent end of the spindle $u^9$ from contact with the trip $V^8$, and thus imparting motion to the shaft $V^4$ and the crank 6, as hereinbefore described, so as to tilt the receptacle W and discharge the shock. This operation can only take place when there is a sufficient number of sheaves in the receptacle to form the shock, and the manner in which this is effected will appear from the following mechanism: Upon the supporting-bar T, I secure the journal-bars $t$, on which is journaled the spindle $t'$.

$t^2$ is a face-ratchet wheel loose on the spindle $t'$, but secured from longitudinal displacement.

$t^3$ is a face-ratchet capable of longitudinal displacement, but designed to rotate with the shaft.

$t^4$ is a slotted arm which is connected to an extension $2^5$ of the compressor-arm $2^4$ by a pin $2^6$.

$t^5$ is an arm pivoted at one end under the bar T and provided with a slotted end $t^6$ at the opposite end, through which the spindle $t'$ extends.

$t^7$ is a depending lug extending downwardly from the arm $t^5$.

$t^8$ is a spring extending between the arm $t^5$ and the ratchet-wheel $t^3$.

$t^9$ is a ratchet-wheel secured on the spindle $t'$ and provided with a laterally-extending tooth 12.

13 is a spring-dog which is designed to engage with the ratchet-wheel $t^9$. The ratchet-wheel $t^9$ has ten peripheral teeth, and this number of teeth is provided to regulate the number of sheaves which it is desired to precipitate into the receptacle W to form the shock, as will hereinafter appear. The shocker knotter-shaft is provided with a sprocket-wheel 14, which is connected by a sprocket-chain 15 to the gearing on the main-wheel frame, from which the knotter-shaft and knotter derive their movement. Necessarily the sprocket is continually revolving, and in order to drive the knotter-wheel, which is fastened on the shaft, I provide the mechanism hereinbefore mentioned, together with the pivoted spring-held trip 16, similar to the trip $V^8$, hereinbefore described, which trip 16 is provided with a roller 17, designed to extend into the pinion 18, secured to the sprocket-wheel 14 when the trip is released.

The operation of the above mechanism is as follows: When the compressor-arm $2^4$ is pushed down in the action of ejecting the sheaf into the shocking-receptacle, it pulls the arm $t^4$ in the direction indicated by arrow, and consequently turns the ratchet-wheel $t^2$ in the corresponding direction, allowing it to slip around the space of one tooth, the spring $t^8$ allowing the ratchet-wheel $t^2$ to give longitudinally. As the compressor-arm is restored to the normal position shown by mechanism which it is not necessary here to describe, as it is common in every binder, it pushes the ratchet-wheel $t^2$ in the direction indicated and pushes with it the ratchet-wheel $t^3$ the space of one tooth. There are ten teeth in both of the ratchet-wheels $t^2$ and $t^3$, and consequently when the ratchet-wheel $t^3$ moves one tooth the ratchet-wheel $t^9$ moves one tooth. It will thus be seen that during the period that nine sheaves are being discharged the ratchet-wheel $t^9$ will have moved nine teeth. When it is finally moved the tenth tooth, the laterally-projecting tooth 12 comes in contact with the slotted end $t^6$ of the arm $t^5$, pushing it toward the knotter-wheel $Y^2$ and relieving the trip 16, which is forced by the spring thereof into the pinion 18, and thereby sets in motion the knotter-wheel $Y^2$ and corresponding knotter mechanism. At the same time the needle is caused to move forward and brings the cord into the knotter, so that the shock is tied and the cord cut in the usual way. As the needle recedes into its normal position the mechanism hereinbefore described is set in motion to tilt the receptacle W and eject the shock. At the period that the shock is being ejected it is of course necessary to prevent any more sheaves being discharged into the receptacle W, and for this purpose I provide the following mechanism: 19 is the ordinary trip, which is connected by the bar 20 and other connections (not necessary here to describe) to the ordinary knotter mechanism, by which the sheaf is tied. 21 is a bent rod extending through the bracket 21' underneath the trip-arm 19 and normally into the segmental notch 22 in the disk 23, secured on the end of the knotter-shaft of the shocking mechanism. Upon each compression of the trip-arm to operate the ordinary knotter mechanism of the binder no effect is produced to prevent the trip-arm from allowing of the discharge of the sheaf, as it works perfectly freely; but as soon as the knotter-shaft of the shocking mechanism starts to rotate it first carries the rod 21, so that the upper end abuts the trip-arm, and consequently during the rotation of the knotter-arm of the shocking mechanism and the tying of the cord of the shock the trip-arm of the ordinary binder mechanism is held rigid, and necessarily the sheaf formed by the delay will be slightly larger and more dense if the grain is accumulated and is fed more quickly than the knotter of the shocker will tie. As soon as the knotter mechanism of the shocking attachment has made its complete revolution the rod 21 drops, and the trip-arm of the ordinary binder mechanism is allowed also to drop and permit of the discharge into the shocking-receptacle of the larger and more dense sheaf that has been compressed during the period that the shocking-knotter is operating. It will thus be understood that there is nothing to prevent the continuous operation of both the binder-knotter and the intermittent operation of the shocker-knotter mechanism, and it does not matter that one out of every ten bound is slightly larger. In order to release the cord when the needle U is being caused to move backward from the shocking-knotter when the sheaves are falling into the cord and into the receptacle, I have provided an arm $20^2$, secured to the crank-spindle $y^4$, which arm as soon as the needle starts to move backward is caused to move downwardly, so as to press the spring-plate $g^9$ and release the cord 9 between the plate $g^5$ and the offset $g^4$, whereby the cord is allowed to pass freely between such plate, from which it extends through the eye 22' at the end of the receptacle to the needle. The cord of course is held in the usual twine-box, which it is not necessary here to describe.

What I claim as my invention is—

1. In a harvester-binder, the combination with the elevating-aprons and the binding-deck and mechanism said deck and mechanism extending at right angles to the line of travel of said aprons rearwardly and outward from the aprons, of the segmental carrying-apron extending from the elevating-aprons to the binding-deck and the wheel-frame located directly underneath the segmental apron and forming a support for the same as specified.

2. In a harvester-binder, the combination with the elevating-aprons and a binding-deck and mechanism said deck and mechanism extending rearwardly at right angles to the line of travel of said aprons and outwardly from the aprons, of the segmental carrying-apron extending from the elevating-aprons to the binding-deck, the wheel-frame located directly underneath the segmental aprons and forming a support for the same and a roller interposed between the discharge end of the apron and the binding-deck and means for driving the same as and for the purpose specified.

3. In a harvester-binder, the combination with the elevating-aprons and a binding-deck and mechanism said deck and mechanism extending rearwardly at right angles to the line of travel of said aprons and outward from the aprons and the segmental carrying-apron and frame thereof having an arc-shaped bar forming the foundation thereof, the bar $s$ supported by the frame of the elevating-apron said bar extending between the ends of the standards of said frame above the end of the apron of the supporting bent brace S' connected at one end to the rod S and at the opposite end to the arc-shaped bar of the segmental frame as and for the purpose specified.

4. In a harvester-binder, the combination with the elevating-aprons and a binding-deck and mechanism said deck and mechanism extending rearwardly at right angles to the line of travel of said aprons and outward from the aprons and the segmental carrying-apron and frame thereof having an arc-shaped bar forming the foundation thereof, of the triangular frame F and the frame G connected at one end to the frame F and secured at its opposite end to the side board A' of the elevator and the rod T for supporting the binding-deck and mechanism, said rod being supported at one end by the frame F as and for the purpose specified.

5. The combination with the segmental carrying-apron, the guiding supporting-rollers for the same and the arc-shaped frame supporting the outer ends of the rollers, of the butter, the vertical frame extending upwardly from the arc-shaped frame and suitably connected thereto and forming journals for the spindle of the butter, a tapered roller the bevel-gear on the spindle of the tapered roller and a pinion on the end of the spindle of the butter meshing with said gear as and for the purpose specified.

6. The combination with the binding-deck extending at right angles to the line of travel of the elevating-aprons and the frame for supporting the same and the vertical depending apron of the binder-deck at the rear of the machine, of the rectangular frame suitably connected to the frame aforesaid, the shocking-receptacle having the bottom arc-shaped in cross-section, the pivotal connection, near the front and discharge end of the receptacle, to the frame and means for tilting the frame as and for the purpose specified.

7. The combination with the binding-deck extending at right angles to the elevating-aprons and the frame for supporting the same and the vertical depending apron of the binding-deck at the rear of the machine, of the rectangular frame suitably connected to the frame aforesaid, the shocking-receptacle having the bottom arc-shaped in cross-section, the pivotal connection near the front and discharge end of the receptacle to the frame, means for tilting the receptacle and the gate extending across the discharge end of the receptacle and means for opening the same when the receptacle is tilted as and for the purpose specified.

8. The combination with the binding-deck extending at right angles to the elevating-aprons and the frame for supporting the same and the vertical depending apron of the binding-deck at the rear of the machine, of the rectangular frame suitably connected to the frame aforesaid, the shocking-receptacle having the bottom arc-shaped in cross-section, the pivotal connection near the front and discharge end of the receptacle to the frame, means for tilting the receptacle, the gate hinged to the downwardly-extending apron of the binding-deck, the rod having a ball-and-socket connection to the gate and to the side bar of the receptacle as and for the purpose specified.

9. The combination with the binding-deck having a downwardly-extending portion and the shocking-receptacle suitably supported, of the closing-gate at the discharge end thereof and the U-shaped rod adjustably held in brackets on the downwardly-extending portion of the binder-deck, the hinges of the gate being pivoted on said rod as and for the purpose specified.

10. The combination with the rectangular frame and bearing bracket and crank, suitably journaled in said brackets, of the shocking-receptacle and an adjustable connection between the side of the receptacle and the crank whereby the degree of tilt of the shocking-receptacle may be altered, substantially as described.

11. The combination with the rectangular frame and bearing bracket and crank suitably journaled in said brackets, of the shocking-receptacle having a bracket attached to the side bar thereof and suitably connected to the crank, a pitman also suitably connected to the crank and means for imparting a reciprocating motion to the pitman as and for the purpose specified.

12. The combination with the rectangular frame and bearing bracket and crank suitably journaled in said brackets and having an arc-shaped slotted end, of the shocking-receptacle having a bracket attached to the side bar thereof and provided with a slotted portion connected to the crank by a bolt and the pitman connected to the crank and the side bracket by a suitable bolt or pin as and for the purpose specified.

13. The combination with the frame and the shocking-receptacle supported and connected to a suitable bearing-crank, of the pitman, the stud-shaft journaled on the frame and provided with a crank connected to the end of the pitman, the bevel-wheel loosely held on the stud-shaft, the shaft supported in the frame provided with a bevel-wheel meshing with the bevel-wheel on the stud-shaft, the collar secured to the stud-shaft, the spring-trip pivoted on the collar, the toothed wheel secured on the bevel-wheel, the spindle suitably journaled and provided with a bent end spring-held to normally engage with the trip, the wheel on the spindle provided with a segmental notch, the shocking-mechanism needle suitably journaled and provided with an arm, means for imparting movement to the needle, a rod connected to the arm and provided with a spring-held bent end designed to engage with the segmental notch and wheel on the spindle as and for the purpose specified.

14. The combination with the ordinary binding compressor-arm and the knotter-shaft of the shocking mechanism, the tube for supporting the same, and the right-angular rearwardly-extending tube having a bearing intermediate of its length, of the needle of the shocking mechanism having the spindle thereof journaled therein, and provided with an arm, a crank on the end of the knotter-shaft and a rod connecting such crank with the arm on the needle-spindle, the counter-spindle, the face ratchet-wheel loosely journaled thereon and having a slotted arm suitably connected to the tail of the compressor-arm, the engaging ratchet-wheel spring-held against the aforesaid ratchet-wheel and held on the spindle so as to rotate therewith, the spring on the spindle, the arm suitably pivoted and provided with a slotted end and a depending lug, the knotter-wheel having a trip pivoted thereon and designed to normally engage with the lug on the pivoted arm the toothed wheel having a lug designed to coact with the pivoted arm and the toothed wheel on the knotter-shaft designed to be engaged by the trip upon its being released from the lug on the slotted arm as and for the purpose specified.

15. The combination with the compressor-arm and knotter-shaft and needle suitably driven therefrom, of the counter-spindle the face ratchet-wheel loosely journaled thereon and having a slotted arm suitably connected to the tail of the compressor-arm, the engaging ratchet-wheel spring-held against the aforesaid ratchet-wheel and held on the spindle so as to rotate therewith, the spring on the spindle, the arm suitably pivoted and provided with a slotted end and a depending lug, the knotter-wheel having a trip pivoted thereon and designed to normally engage with the lug on the pivoted arm the toothed wheel having a lug adapted to coact with the pivoted arm and the toothed wheel on the knotter-shaft designed to be engaged by the trip upon its being released from the lug on the slotted arm as and for the purpose specified.

16. The combination with the compressor-arm and knotter-shaft and needle suitably driven therefrom, of the counter-spindle the face ratchet-wheel loosely journaled thereon and having a slotted arm suitably connected to the tail of the compressor-arm, the engaging ratchet-wheel spring-held against the aforesaid ratchet-wheel and held on the spindle so as to rotate therewith, the spring on the spindle, the arm suitably pivoted and provided with a slotted end and a depending lug, the knotter-wheel having a trip pivoted thereon and designed to normally engage with the lug on the pivoted arm, the toothed wheel on the knotter-shaft designed to be engaged by the trip upon its being released from the lug on the slotted arm, and the ratchet-wheel, provided with a determinate number of teeth corresponding to the teeth of the ratchets before mentioned, engaged by a dog, and having a laterally-extending tooth designed to engage with the slotted end of the arm as and for the purpose specified.

17. The combination with the ordinary trip-arm suitably connected to and throwing into operation the ordinary binding mechanism for the sheaf, of the knotter-shaft of the shocking binding mechanism and means interposed between the trip-arm and such shaft for momentarily holding the trip-arm rigid during a period that the shock is being tied as and for the purpose specified.

18. The combination with the ordinary trip-arm suitably connected to and throwing into operation the ordinary binding mechanism for the sheaf, of the knotter-shaft of the shocking binding mechanism, the disk on the end of the knotter-shaft provided with a segmental notch, the rod designed to ride on the disk during the period that the shock is being bound, such rod being suitably held and extending underneath the trip-arm and normally resting in the segmental notch as shown and for the purpose specified.

19. The combination with the shocking knotter mechanism and the tube forming a bearing for the same and the right-angular rearwardly-extending tube connected to the former tube, the needle having a spindle suitably journaled in bearings intermediate the length of the tube, deriving movement from the knotter-shaft, and provided with an arm upon the end of the spindle thereof, and the bearing-tube extending at right angles to the rearwardly-extending tube at the rear end thereof, the crank-spindle journaled in such tube and provided with an end arm, the rod connecting the arm to the arm on the needle-spindle, the compressor-arms suitably connected to the laterally-extending ends of the crank and held in position at the bottom to the frame as and for the purpose specified.

20. The combination with the shocking-receptacle and the frame supporting the same, of the needle deriving movement as specified, the bar forming part of the frame and provided with a lateral extension, the plate underneath such extension between which and the lateral extension the cord passes, spring means for holding the plate up against the lateral extension, a spring-plate secured on the lateral extension and provided with a pin projecting through such extension against the spring-held plate and means for depressing such spring as and for the purpose specified.

21. The combination with the shocking-receptacle and the frame supporting the same, of the needle deriving movement as specified, the bar forming part of the frame and provided with a lateral extension, the plate underneath such extension between which and the lateral extension the cord passes, spring means for holding the plate up against the lateral extension, a spring-plate secured on the lateral extension and provided with a pin projecting through such extension against the spring-held plate, the rearwardly-extending tube, the right-angular extension at the end thereof, the crank-spindle journaled in the same and the arm secured to the crank and designed to engage with the spring-plate, so as to release the cord at the proper time as and for the purpose specified.

JAMES CALDER.

Witnesses:
B. BOYD,
A. H. MCADAM.